F. O. BULLIS.

DISPENSING MACHINE.

APPLICATION FILED SEPT. 5, 1914.

Reissued Jan. 5, 1915.

13,859.

4 SHEETS—SHEET 1.

Witnesses

Chas. C. Richardson.

E. E. Alger.

Inventor

Frederick O. Bullis

By

Attorneys

F. O. BULLIS.

DISPENSING MACHINE.

APPLICATION FILED SEPT. 5, 1914.

Reissued Jan. 5, 1915.

13,859.

4 SHEETS—SHEET 2.

Witnesses

Chas. E. Richardson.

E. E. Alger.

Inventor

Frederick O. Bullis

By [illegible]

Attorneys

F. O. BULLIS.

DISPENSING MACHINE.

APPLICATION FILED SEPT. 5, 1914.

Reissued Jan. 5, 1915.

13,859.

4 SHEETS—SHEET 3.

Witnesses

Chas. C. Richardson

E. E. Alger.

Inventor

Frederick O. Bullis

By L. G. E. Hoffmann

Attorneys

F. O. BULLIS.

DISPENSING MACHINE.

APPLICATION FILED SEPT. 5, 1914.

Reissued Jan. 5, 1915.

13,859.

4 SHEETS—SHEET 4.

Witnesses

Chas. C. Rehmann.

E. E. Alger.

Inventor

Frederick O. Bullis

By [illegible]

Attorneys

UNITED STATES PATENT OFFICE.

FREDERICK O. BULLIS, OF LOUISVILLE, KENTUCKY, ASSIGNOR TO LEKTRIC SALES COMPANY, OF LOUISVILLE, KENTUCKY, A CORPORATION.

DISPENSING-MACHINE.

13,859. Specification of Reissued Letters Patent. Reissued Jan. 5, 1915.

Original No. 994,717, dated June 13, 1911, Serial No. 545,408. Application for reissue filed September 5, 1914. Serial No. 860,461.

*To all whom it may concern:*

Be it known that I, FREDERICK O. BULLIS, a citizen of the United States, formerly of Rochester, in the county of Monroe and State of New York, now residing at Louisville, in the county of Jefferson and State of Kentucky, have invented certain new and useful Improvements in Dispensing-Machines, of which the following is a specification.

This invention relates to improvements in machines for dispensing foods or beverages, particularly to machines of an automatic character such as are or may be controlled in their operation by the deposit of coins or other tokens.

One object of this invention is to provide a machine of the character above referred to with novel and effective means for delivering a portion of food or beverage in a heated, and particularly in a freshly-cooked condition. To this end I employ a cylindrical cooker having both a rotary and a tilting movement, as will be hereinafter more particularly described.

Another object of the invention is to produce a machine of the kind referred to which shall have provision for delivering condiments, to be added to the food or beverage dispensed at the option of the customer. To this end I provide my machine with means for delivering measured quantities of solid or liquid condiments, such means operating automatically to measure the material delivered, but requiring, for the completion of the delivery, a voluntary operation on the part of the customer, so that in case the condiments are not required by the customer they shall not be delivered.

Other objects of my invention, and the details of construction by which they are accomplished, will be set forth in connection with the description of the illustrated embodiment of my invention.

Figure 5:
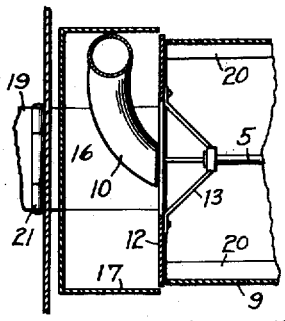
Figure 6:
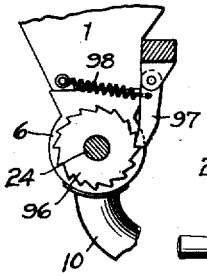
Figure 1:
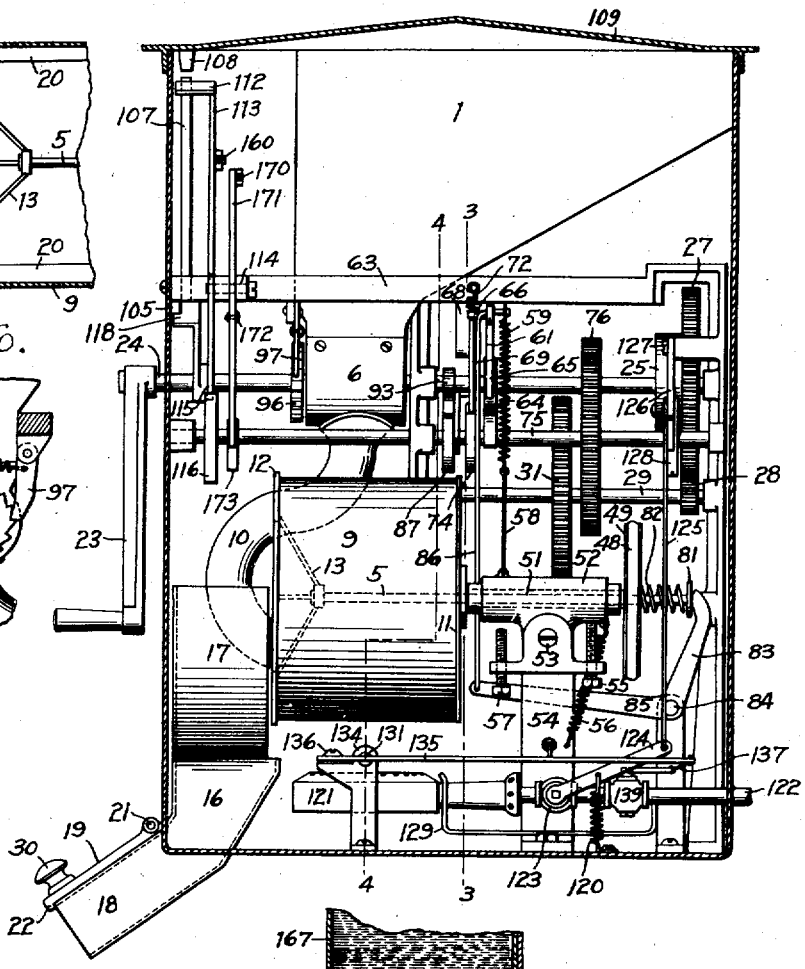
Figure 7:
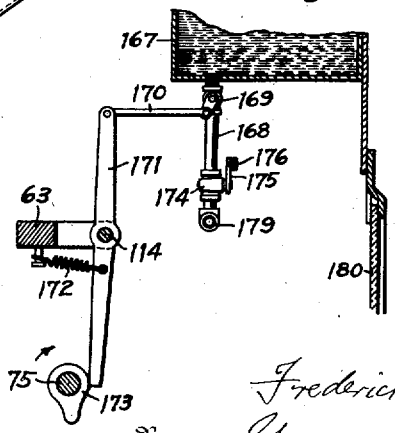
Figure 7:
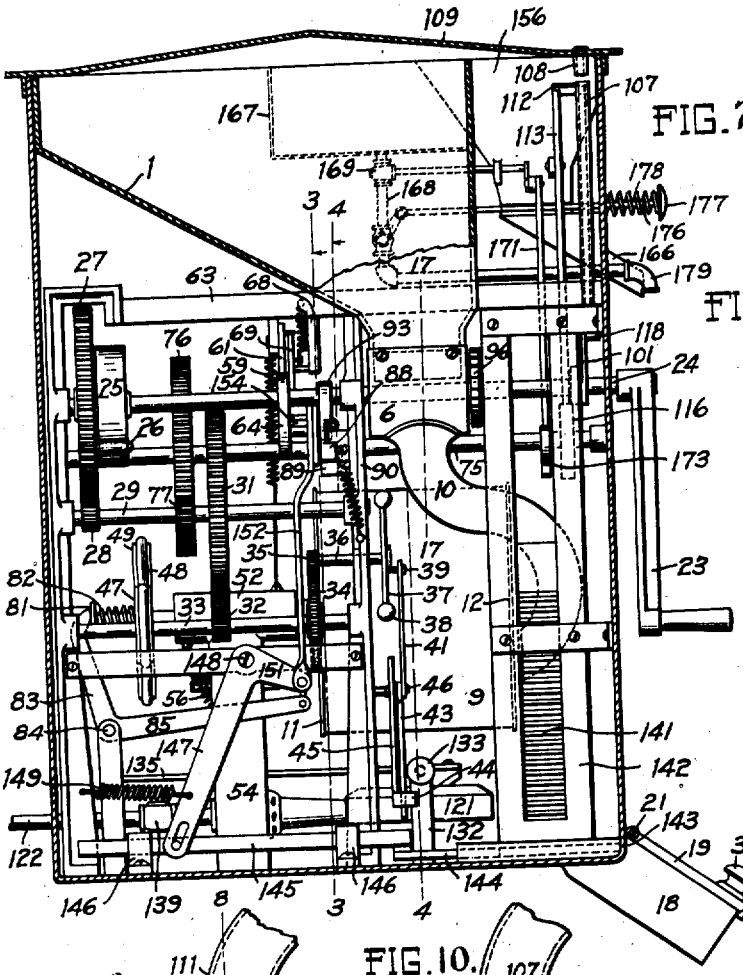
Figure 8:
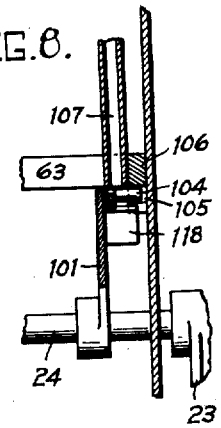
Figure 9:
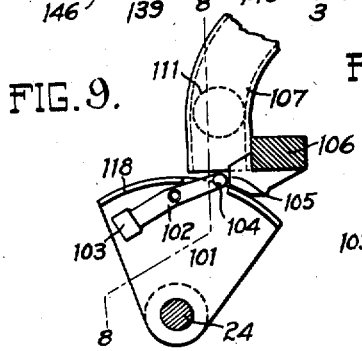
Figure 10:
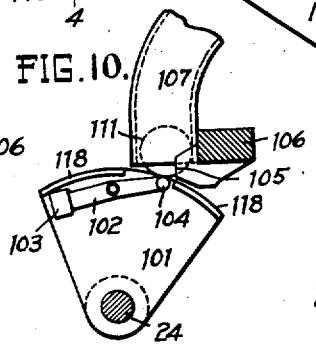
Figure 11:
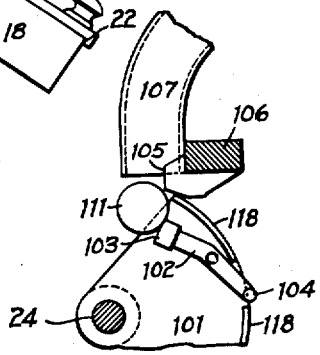
Figure 3:
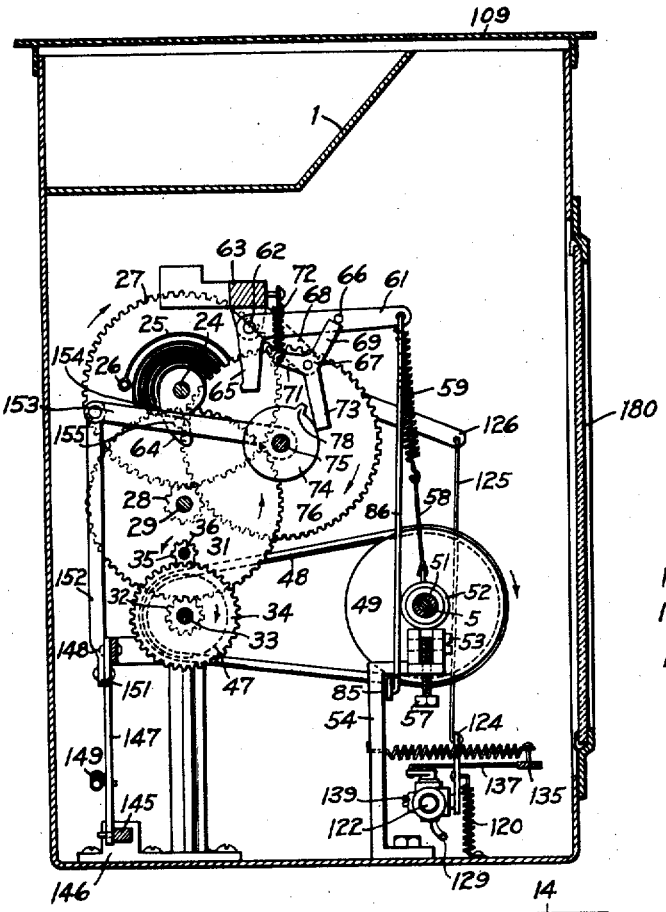
Figure 12:
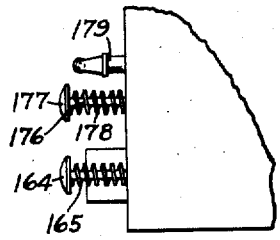
Figure 14:
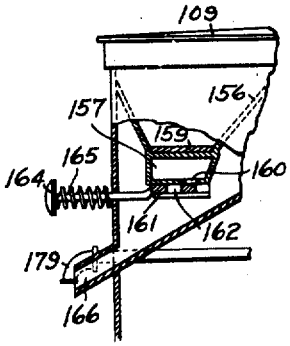
Figure 13:
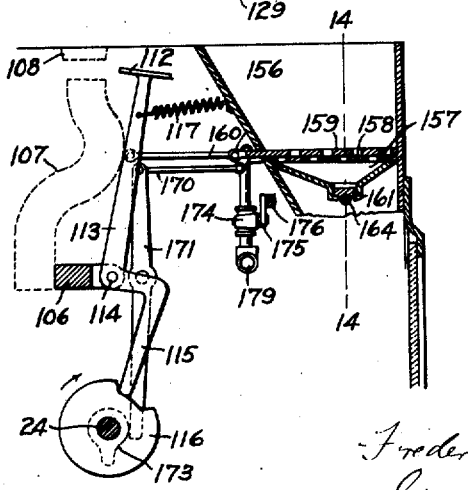
Figure 4:
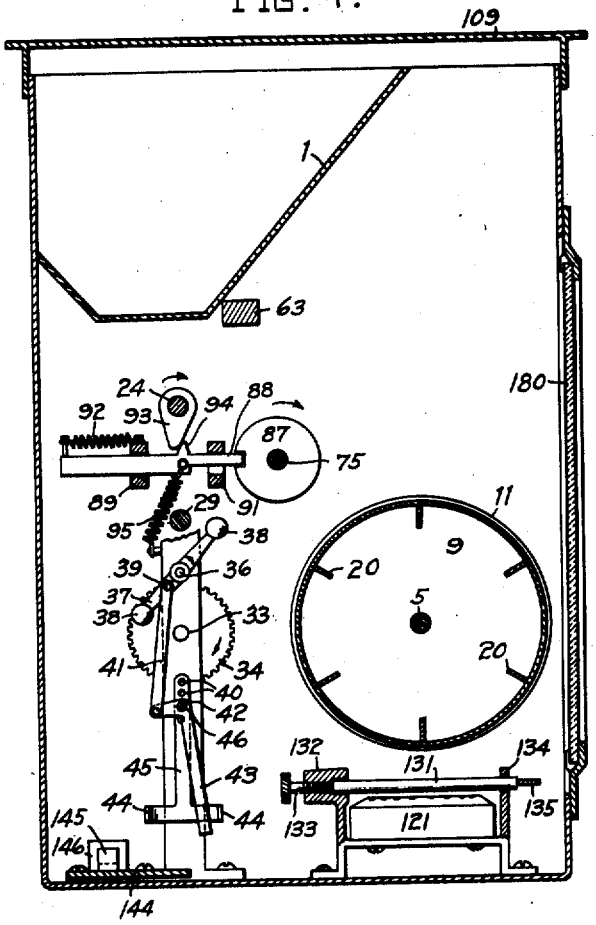
Figure 15:
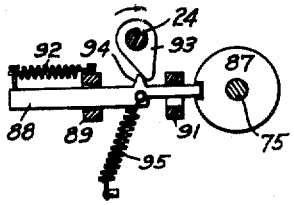
Figure 16:
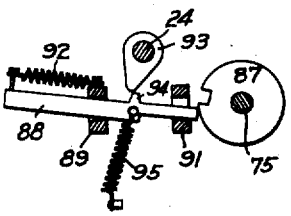
Figure 17:
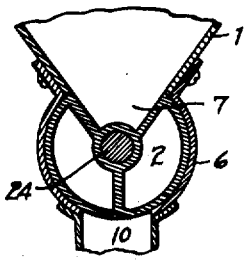
Figure 18:
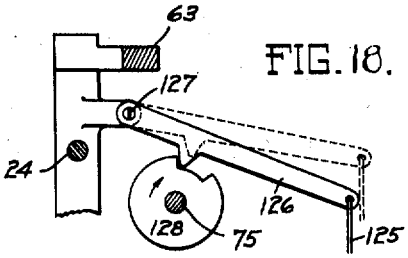

In the accompanying drawings:—Figure 1 is a right-side elevation of a machine embodying the present invention, with the side of the casing of the machine removed to disclose the interior mechanism; Fig. 2 is a left-side elevation of the machine, with the side of the casing removed; Fig. 3 is a vertical section of the machine on the line 3—3 in Fig. 2, looking from right to left; Fig. 4 is a partial vertical section on the line 4—4 in Fig. 2, looking from right to left; Fig. 5 is a horizontal section of a portion of the cooker and the discharge chute; Fig. 6 is a detail view of the ratchet and pawl for preventing reverse rotation of the power-shaft; Fig. 7 is a detail view of the mechanism for measuring fluid condiment; Fig. 8 is a section on the line 8—8 in Fig. 9, looking from left to right, and showing the coin-release mechanism; Fig. 9 is a front elevation of the coin-release mechanism; Figs. 10 and 11 are views similar to Fig. 9, but showing the mechanism in different positions; Fig. 12 is a plan view showing in detail the plungers and discharge orifices for the condiment-delivering means; Fig. 13 is a detail view showing the mechanism for closing the coin-slot and for measuring solid condiment, together with a portion of the mechanism for measuring fluid condiment; Fig. 14 is a detail view, partly in vertical section, showing the manually-operated valve for delivering solid condiment; Figs. 15 and 16 are detail front elevations showing two different positions of the stop mechanism; Fig. 17 is a section on the line 17—17 in Fig. 2, showing the rotary device for measuring and delivering food from the hopper; and Fig. 18 is a detail view of a part of the mechanism for automatically controlling the gas burner.

The illustrated embodiment of my invention is a machine controlled by the deposit of a coin, and adapted to heat or cook and deliver a solid food substance, such as popped corn, together with a solid condiment, such as salt, and liquid condiment, such as oil or melted butter.

The corn or other food material is contained in a receptacle in the form of a hopper 1 at the top of the machine, which has a bottom sloping downwardly to a discharge outlet controlled by a rotary measuring valve 2 (see Fig. 6). The measuring valve fits closely and turns in a cylindrical casing 6 attached to the bottom of the hopper and is provided with a chamber 7 which receives a portion of food from the hopper. When the machine is operated the measuring valve is rotated through a complete rotation, and the food in the chamber 7 is thereby carried to a downwardly-extending tube 10 connected with the bottom of the casing 6. Through the tube the food is delivered to the cooker, which is in the form of a cylindrical drum 9. The cooker is closed at its rear end by a plate 11, but its forward end is open. The food is retained in the open end of the drum by means of a movable flat ring 12 until it has been sufficiently cooked or heated and is to be discharged. The ring 12 is mounted on arms 13 on a shaft 5 which projects through the drum and connects the ring with the means for moving it toward and from the end of the drum. The inner surface of the drum is provided with longitudinal baffles 20, and during the cooking operation the drum is rotated and the baffles assist in the distribution and stirring of the food. After the heating operation has continued for a more or less definite length of time, the ring 12 is moved away from the mouth of the drum and the drum is tilted so as to discharge its contents through the forward open end. The food so discharged is received in a chute 16 which has side walls 17 embracing the end of the drum. The chute 16 has an extremity 18 projecting from the front of the machine at the bottom thereof, and through this outlet the food is delivered to the customer. In order to assist the introduction of the food into a paper bag, the discharge chute is provided with a plate 19 hinged at 21 to the chute and having a lug 22 extending downwardly over the forward edge of the chute. By means of a handle 30 this plate is raised, and the mouth of the bag is then drawn over the end of the chute by the customer. The plate is then dropped upon the bag and, through its weight, and through the coöperation of the lug 22 with the edge of the chute, the bag is securely held in position to receive the food.

The power by which the various automatic mechanisms of the machine are actuated is furnished by the customer. To this end a hand-crank 23 is mounted upon the end of a power-shaft 24 which is journaled in the frame of the machine and projects through the front of the casing. The customer turns this crank through a complete rotation, and thereby winds a spiral spring 25 (Fig. 2) which is connected, at its inner end, with the power-shaft 24. The outer end of the spring is connected to a pin 26 fixed in a gear 27 which is loosely journaled upon the power-shaft. The gear 27 meshes with a pinion 28 fixed on a countershaft 29 which is journaled in the frame of the machine. By the unwinding of the spring 25 the countershaft is rotated, through the action of the gear and pinion, and from this countershaft is derived the motion of the several shafts by which the mechanism is actuated. In order to govern the time of operation of the automatic mechanisms an escapement device or governor is connected with the countershaft. A gear 31 fixed on the countershaft meshes with a pinion 32, fixed on a shaft 33 journaled in the frame of the machine. The shaft 33 carries a gear 34 engaging a pinion 35, and the pinion 35 is fixed on a shaft 36 journaled in the frame of the machine. Upon the forward end of the shaft 36 is fixed an arm 37 having weights 38 at its ends so as to act as a balance for the mechanisms. Upon the balance-arm 37 is a crank pin 39 upon which is pivoted a pitman 41. The lower end of the pitman is pivoted to the short arm of a bell-crank lever 42 (Fig. 4). The bell-crank lever is pivoted upon a screw 46 mounted in the frame of the machine. The bell-crank lever has a long depending arm 43, of which the lower end lies between two forwardly-projecting lugs 44 on an arm 45 pivoted upon and depending from the screw 46. By the rotation of the balance-arm and the operation of the pitman 41 the bell-crank lever is oscillated. The distance between the lugs 44 is somewhat less than the path of movement of the depending arm of the bell-crank lever, so that this arm strikes the lugs and vibrates the arms 45. The arm 45 thus retards the movements of the bell-crank lever, and in this way limits the speed of operation of the gear train through which it is actuated. The arm 45 is provided, at its upper end, with a plurality of holes 40, either one of which may serve as its pivotal point of support, and, by changing the arm from one hole to another on the screw 46, the escapement may be regulated to vary its speed of operation.

To rotate the cooker during the heating or cooking operation the shaft 33 is provided with a pulley 47 which is connected, by a belt 48, with a pulley 49 (Fig. 1). The pulley 49 is fixed on a hollow shaft 51 which embraces the shaft 5 and upon which the cooker drum 9 is fixed at its closed rear end 11. By means of the belt and pulleys the shaft 51 and the drum are constantly rotated while the food is being heated therein.

To provide for the tilting of the cooker in discharging its contents, the shaft 51 is journaled in a bearing-block 52 which is pivotally mounted, at 53, upon an upright 54 constituting a part of the frame of the machine. In the normal horizontal position of the bearing-block its rear end rests upon a stop screw 55 threaded in a lug on the upright 54. A spring 56 assists in maintaining the parts in this position, although the force of this spring is less than sufficient to perform this function by itself. The function of the spring is to relieve the automatic mechanism of a part of the weight of the cooker. When the cooker is tilted into discharging position by the tilting the bearing-block on its pivot the forward end of the bearing-block is stopped by a stop screw 57 threaded in a lug on the upright 54. The tilting movement of the bearing-block is controlled by a rod 58 connected with a tension spring 59 which is pivotally connected, at its upper end, with a cam-lever 61 (Fig. 3). The cam-lever is pivoted at 62 upon lugs depending from a bar 63 which constitutes a part of the frame of the machine. In the normal position of the machine the cooker remains in tilted position after having discharged the last portion of food heated therein and the cam-lever is, therefore, in lowered position, the spring 56 being insufficient, as has been stated, to raise the cooker without assistance from the cam-lever. When a customer rotates the power-shaft 24, in starting the machine, a cam 64 is fixed upon the shaft engages a depending arm 65 on the cam-lever 61 and thereby raises the cam-lever, and, through the action of the spring 59 and the rod 58, raises the cooker to horizontal position. The cam-lever is retained in raised position by means of a pin 66 fixed in the lever, which coöperates with a detent 67 pivoted upon an arm 68 projecting downwardly from the frame-member 63. The detent has an upwardly-extending arm 69 upon which the pin 66 rests, and an arm 68 connected with the frame-member 63 by a tension spring 72. The detent is arrested in operative position, as shown in Fig. 3, by a depending arm 73 which rests against the periphery of a cam 74. The cooker is released from horizontal position and allowed to tilt to discharge its contents through the action of the cam 74 above referred to. This cam is fixed upon a cam-shaft 75 which is journaled in the frame of the machine. The cam-shaft is driven by a gear 76 engaging a pinion 77 upon the countershaft 29. The ratio of the gear 76 and pinion 77 is the same as that of the gear 27 and the pinion 28, so that the cam-shaft rotates at the same rate of speed as the gear 27, and therefore makes one complete turn for each operation of the machine. The cam 74 has a smooth circular periphery throughout, with the exception of a short raised portion 78. This raised portion is so located that after the cam-shaft has made nearly a complete turn it engages the arm 73 on the detent, trips the detent, and allows the cam-lever 61 to fall and lower the cooker.

In order to move the shaft 5 longitudinally to carry the ring 12 away from the mouth of the cooker drum 9, in discharging the contents of the drum, the shaft 5 projects rearwardly from the hollow shaft 51 and is provided with a flat head 81. A compression spring 82, surrounding the shaft between the head 81 and the pulley 49, normally holds the shaft 5 and the ring 12 in the position of Fig. 1. A bell-crank lever pivoted at 84 upon the frame of the machine has an upwardly-extending arm 83 which engages the head 81 and a horizontal arm 85 which is connected, by a rod 86, with the cam-lever 61. When the cam-lever is drawn down in the tilting of the cooker the rod 86 swings the bell-crank lever on its pivot, and the lever operates to push the shaft 5 forward and thus move the ring 12 from the mouth of the drum.

The starting and stopping of the automatic mechanisms is controlled by a stop mechanism illustrated in Figs. 4, 15 and 16. Upon the cam-shaft 75 is a disk 87 of generally-circular form, provided with a square notch which is engaged by a stop 88. The stop 88 slides horizontally in two pairs of lugs 89 and 91 mounted on a member 90 of the frame of the machine (Fig. 2). A tension spring 92 connected with the rear end of the stop tends normally to move the forward extremity into engagement with the stop disk 87. A tension spring 95, connected with the stop tends to drawn down the forward end of the stop, such movement being permitted by the form of the opening between the lugs 91 which, as shown in the drawings, is much wider than the portion of the stop embraced thereby. While the machinery is at rest, however, the stop engages the notch in the stop-disk, and, owing to the tendency of the latter to rotate with the cam-shaft, the stop is held in raised position as in Figs. 4 and 15. The stop is released by means of a trip 93 fixed on the power-shaft 24 and adapted to engage a lug 94 on the top of the stop. When the power-shaft has been given a substantially complete rotation by means of the head-crank, the trip moves from the position of Fig. 4 to the position of Fig. 15 and then, by its continued movement, it moves the stop back out of engagement with the stop disk. As soon as the stop is thus disengaged the spring 95 draws it down, as shown in Fig. 16, so that the lug 94 disengages the trip and permits the latter to move to its original position upon the completion of the rotation of the power-shaft. The stop now remains in the position of Fig. 16, while the spring 92 holds it constantly against the surface of the stop disk until the cam-shaft has made nearly a full rotation and thereby brought the notch again into engagement with the stop. As soon as this occurs the stop enters the notch and arrests the movement of the disk and the cam-shaft in their original position. To prevent retrograde movement of the power-shaft and maintain the power spring in wound condition, a ratchet 96 (Figs. 2 and 6) is fixed on the power-shaft beside the valve casing 6, and a pawl 97, pivotally mounted upon the frame of the machine, engages the ratchet and is held in engagement therewith by a spring 98.

The operation of the machine is controlled by the deposit of coin, and the coin-control mechanism acts both to prevent the power-shaft from being turned until a coin has been deposited, and also to arrest the movement of the power-shaft at the completion of a rotation. As shown in Figs. 8, 9, 10 and 11, a sector-shaped plate 101 is fixed on the power-shaft, and upon this plate is pivoted a detent 102 carrying a pin 104 which normally engages a lug 105 fixed to a member 106 of the frame of the machine. The rear end of the detent 102 is provided with a weight 103 which overbalances the pin and normally holds it in raised position as shown in Fig. 9. A coin chute 107 terminates just above the stop pin 104. This chute (Fig. 13) is tortuous in form to prevent the insertion of an instrument of any kind to tamper with the operation of the machine. Its upper end terminates a short distance below a coin-slot 108 in the cover 109 of the casing of the machine. When a coin is inserted in the coin-slot it passes downward through the coin chute and engages the stop pin 104, as shown at 111 in the drawings. The weight and impact of the coin are sufficient to depress the stop pin out of engagement with the stop lug 105. The power-shaft is now free to be turned, and, when this is done, the coin is released from the chute, as shown in Fig. 11, and drops down into the bottom of the casing of the machine. Upon the completion of the rotation of the power-shaft it is again arrested by the stop pin 104 since the latter, having been relieved from the weight of the coin, has again risen into position to engage the stop lug. Retrograde movement of the power-shaft and the handle are prevented at this time by the ratchet-and-pawl mechanism above described, and the handle is thus locked against any movement until after the deposit of another coin.

Means are provided for preventing the deposit of a second coin in the chute during the rotation of the power-shaft. To this end a gate 112 (Figs. 2 and 13) is mounted upon the upper end of a lever 113 which is pivoted at 114 on the frame member 106. The lower arm 115 of the lever 113 engages a cam 116 fixed to the power-shaft. This cam is formed with a short depressed portion which is in engagement with the cam lever when the machine is in its normal inoperative position, and at such time the gate is in the position of Fig. 13, being retracted by a tension spring 117 connected with the cam-lever. During the rotation of the power-shaft the cam 116 is in such position as to move the cam-lever so as to cause the gate 112 to be interposed in the space between the coin-slot and the coin-chute, and the gate thus prevents the insertion of a second coin in the chute. To prevent the passage of a second coin which might be introduced during the short interval in which the gate is moving to or from closed position, the plate 101 is provided with flanges 118 on either side of the stop pin 104, and a coin at the bottom of the chute rests upon these flanges except when the power-shaft is in normal position or the coin-gate is closed as above described.

To heat the cooker during its cooking or heating operation the machine is provided with a gas burner of ordinary form and with automatic mechanism for throwing the gas burner into operation at the commencement of the operation of the machine and for throwing it out of operation after the completion of the cooking or heating operation. A gas burner 121 (Fig. 1) is supplied with gas through a pipe 122 which is connected with any suitable source of supply outside of the machine. The flow of gas to the burner is controlled by a cut-off valve 123. This valve is connected with an arm 124 which is normally held depressed by a tension spring 120 connected therewith. The arm is connected, by a rod 125, with a cam-lever 126 which is pivoted at 127 upon the frame of the machine. The cam-lever has a downwardly-projecting lug engaging a cam 128 on the cam-shaft 75 (Fig. 18). The lug normally rests in a depression in the cam, but when the cam is rotated by the rotation of the cam shaft the cam-lever is raised and, through the connections above described, the cut-off valve 123 is opened and the gas burner thrown into operation. The time of operation of the burner is controlled by the form of the cam 128, and is arranged in the illustrated machine to occupy the greater portion of the period of rotation of the cam-shaft. The gas burner is ignited by means of a constantly-burning pilot light. This pilot light is supplied with gas through a small by-pass tube 129 which terminates, as shown in Fig. 1, close to the burner so that the flame of the pilot light shall ignite the burner when the cut-off valve is open.

When the machine is thrown into operation after having been out of operation for some time, so that the cooker is cold, a substantial interval of time is required to heat the cooker before the cooking of the food therein commences, and allowance is made for this interval in timing the operations of the machine. When, on the other hand, the machine is thrown into operation immediately after having been previously operated, so that the cooker is still in more or less heated condition, less heat is required during the predetermined interval of time to complete the cooking operation. In order to render the operation of the machine substantially uniform in this respect the machine is provided with a thermostatic device which operates automatically to vary the action of the burner according to the temperature of the machine when thrown into operation. As shown in Figs. 1 and 4, a thermostatic bar 131 is arranged in horizontal position a short distance above the burner. One end of the thermostatic bar rests in a socket 132 on the frame of the burner, and the end of the bar abuts against an adjusting screw 133 threaded in the socket. The other end of the bar plays loosely in a hole in a lug 134 on the frame of the burner and abuts against a lever 135 which is pivotally mounted at 136 on the frame of the burner. The rear end of the lever 135 is connected, by a link 137, with an arm on a controlling-valve 139 interposed in the gas-pipe 122. The thermostatic bar expands in accordance with its temperature, and thereby moves the lever and closes the controlling valve to a greater or less extent. The thermostatic bar is heated directly by the burner, and, during the continuous operation of the machine, the thermostat operates to cut down the flame considerably. After the machine has stood inoperative long enough for the parts to become entirely cooled, the thermostat permits the regulating valve to open wide and thus a flame of full volume is permitted at the beginning of the operation and until the thermostat and the cooker have both been heated. The thermostat then expands and cuts down the gas flame to the amount required to maintain the working temperature of the cooker. The thermostatic bar is made of material, such as copper, having high heat capacity, and it has sufficient body to cause it to retain heat substantially as long as the cooker. If, therefore, the machine be thrown into a second operation immediately or soon after a previous operation, the thermostat, as well as the cooker, remains hot and acts more quickly to cut down the gas flame, and thus regulates the heating effect in accordance with the initial temperature of the cooker.

Means are provided for delivering automatically a bag to each customer for the reception of the food delivered by the machine. The bags 141 (Fig. 2) are compactly folded and stacked in a holder 142 of ordinary form within the casing of the machine. The bottom of the holder communicates with a slot 143 extending to the front of the machine. In the slot is a plunger 144 by which the bags are expelled one by one through the slot. The plunger is actuated through a slide rod 145 moving in bearings 146. A bell-crank lever pivoted at 148 on the frame of the machine has a long arm 147 connected with the slide rod by a pin-and-slot connection. A tension spring 149 connected with the lever retains the rod and the plunger normally in retracted position. The short arm 151 of the lever is connected, by a link 152, with a lever 153 which is loosely pivoted on the cam-shaft 75 (Fig. 3). The lever 153 has a lug 154 on its rear side, and this lug is in position to be engaged by a pin 155 on the cam 64. At each rotation of the power-shaft the pin engages the lug, raises the lever 153, and, through the mechanism above described, causes the plunger to deliver a bag.

The machine is provided with means for delivering a solid condiment such as salt. A supply of salt is kept in a hopper or receptacle 156 (Figs. 2 and 13), and beneath this receptacle is a measuring compartment 157 adapted to hold the amount of salt to be delivered at each operation of the machine. The bottom 158 of the hopper is provided with numerous perforations, and the flow of salt through these perforations is controlled by a valve in the form of a perforated plate 159. Normally the perforations in the valve do not register with those in the bottom of the hopper, but the valve is connected, by a link 160, with the lever 113 by which the coin-gate is operated as above described, and, therefore, at each operation of the machine, the valve is once opened and closed and the measuring compartment filled with salt. The delivery of the salt is controlled, at the option of the customer, by means of a manually-operable valve 162 arranged to slide in the bottom of the measuring compartment (Figs. 12, 13 and 14). This valve is moved by a plunger 164 extending out at the front of the casing and normally held in outward position by a compression spring 165. The salt passes through the valve to a chute 166 at the front of the machine, and is thus delivered into the food receptacle when the latter is held beneath the chute and the plunger pressed. The automatic operation is such that, on the one hand, only a predetermined quantity of salt is delivered, proportioned to the amount of food delivered at the same operation, and, on the other hand, if the customer does not elect to use the salt it remains in the measuring compartment until used by a subsequent customer. This arrangement secures the utmost economy in dispensing the salt, or other condiment, while leaving its use optional according to the taste of the customer.

The machine is provided also with means for dispensing a liquid condiment, such for example, as oil or melted butter in the case of a machine arranged to dispense popped corn. A supply of such condiment is kept in a tank 167 (Figs. 1 and 7) located beside the salt hopper, and the flow of the liquid is controlled by an automatic valve 169 located in the outlet pipe 168 from the tank. This valve is connected, by a link 170, with a cam-lever 171 pivotally mounted upon the frame-member 63. The lower end of the cam-lever engages a cam 173 fixed on the cam-shaft 75. A tension spring 172 holds the cam-lever against the cam and keeps the valve normally closed. At each operation of the machine, however, the valve 169 is once opened and closed. Below the automatic valve is a manually-operable valve 174, and at each operation of the former the pipe between the two valves is filled with liquid and serves as a measuring compartment therefor. The manually-operable valve 174 has an arm 175 connected, by a link 176, with a plunger 177 arranged beside the salt plunger, and similarly controlled by a compression spring 178. When the plunger is pressed the liquid flows from the pipe 168 and through the valve into a discharge pipe 179, which terminates at the front of the machine, beside the chute through which the salt is delivered. The operation of this mechanism is substantially the same as that of the mechanism for delivering solid condiment.

The several receptacles of the machine may be filled upon removing the cover 109 from the top of the casing, and this cover, when in use, is secured upon the casing by any suitable means, and may be locked in place to prevent its unauthorized removal. To exhibit the workings of the machine to the customer, a transparent glass panel 180 is placed in one side of the casing (Fig. 3).

The operation of the machine has been sufficiently described in connection with the description of the several mechanisms thereof. The general operation of the machine is as follows: The customer deposits a coin in the coin slot and imparts a single rotation to the power-shaft by means of the hand crank. The customer then withdraws the bag, of which a portion protrudes from the front of the casing, opens the bag, and fixes it upon the delivery chute as above described. A short space of time is then occupied in the cooking or heating of the food, upon the completion of which the food is automatically discharged into the bag. The customer then removes the bag from the chute, holds it beneath the discharge passages of the condiment-dispensing devices, and pushes one or both of the plungers at his discretion. The machine is then in condition for a new operation.

It will be obvious that the part of the machine which I have described as the cooker is adapted to subject the food to an operation varying from merely warming food to a cooking operation of unlimited duration. In the case of popped corn, the corn is preferably put in the machine in completely raw condition, and about two minutes are consumed in cooking the corn. The length of time during which the food is subjected to the heating operation may be varied by the adjustment of the escapement mechanism hereinbefore described, to adapt the machine to operate upon foods of different character.

While I have described a machine adapted for operation upon solid food, my invention is not limited in this respect, but the invention is equally applicable to a machine for dispensing liquid food or beverages in a heated condition.

Having thus fully described my invention what I claim as new and desire to protect by Letters Patent is:

1. In a dispensing machine having, in combination, means operating automatically to deliver a portion of food, means operating automatically to measure a portion of condiment, a common controlling device for causing both said means to operate and manually-controlled means for delivering said condiment.

2. A dispensing machine having, in combination, a cooker comprising a cylindrical body open at one end and a removable cover engaging said end, means for heating the cooker, means for rotating the cooker about its axis during the heating operation, and means for tilting the cooker longitudinally and removing the cover from the end thereof to discharge the contents of the cooker at the completion of the cooking operation.

3. A dispensing machine having, in combination, a cooker comprising a cylindrical body open at one end and mounted both to rotate axially and to tilt longitudinally, a cover movable toward and from the open end of the cooker and having a central opening, an inlet-chute arranged to discharge through said opening into the cooker, an outlet-chute arranged below the open end of the cooker, means for discharging a measured portion of food through the inlet-chute into the cooker, means for rotating and heating the cooker, and means operating after the cooking operation is completed to move the cover away from the cooker and permit the cooker to tilt so as to discharge its contents through the outlet-chute.

4. In a dispensing machine, means operating automatically to deliver a portion of food, means operating automatically to measure a portion of solid condiment, means operating automatically to measure a portion of liquid condiment, a common controlling device for causing all of said means to operate, and manually controlled means for delivering said condiments.

5. In a dispensing machine, means operating automatically to deliver a portion of food, means operating automatically to measure a portion of solid condiment, means operating automatically to measure a portion of liquid condiment, a common controlling device for causing all of said means to operate, and means for delivering said condiments.

6. In a dispensing machine, means operating automatically to deliver a portion of food, means operating automatically to measure a portion of solid condiment, means operating automatically to measure a portion of liquid condiment, a common controlling device for causing all of said means to operate, manually controlled means for delivering said solid condiment, and manually controlled means for delivering said liquid condiment.

7. In a dispensing machine, means operating automatically to deliver a portion of food, means operating automatically to measure a portion of solid condiment, means operating automatically to measure a portion of liquid condiment, a common controlling device for causing all of said means to operate, means for delivering said solid condiment, and means for delivering the liquid condiment.

8. In a dispensing machine, means operating automatically to pop and deliver the popped corn, means operating automatically to measure a portion of condiment, a common controlling device for causing both said means to operate and manually controlled means for delivering said condiment.

9. In a dispensing machine, a cooker in which to pop corn, a heating means to effect popping of corn, means to rotate the cooker during the heating operation, means to effect discharge of the popped corn from the cooker, means operating automatically to measure a portion of condiment, and manually controlled means for delivering said condiment.

10. In a dispensing machine, a cooker in which to pop corn, a heating means to effect popping of the corn, means to rotate the cooker during the heating operation, means to effect discharge of the popped corn from the cooker, means operating automatically to measure a portion of condiment, manually controlled means for delivering said condiment, means operating automatically to measure a portion of another kind of condiment, and manually controlled means for delivering the other kind of condiment.

11. In a dispensing machine, means operating automatically to deliver a portion of food, means operating automatically to measure a portion of solid condiment, means operating automatically to measure a portion of liquid condiment, a common controlling device for causing all of said means to operate, and means for delivering said condiments separately.

12. In a dispensing machine, means operating to deliver food, means operating automatically to measure a portion of condiment, means operating automatically to measure another portion of condiment, a common controlling device for causing all of said means to operate, and manually controlled means for delivering said condiments.

13. In a dispensing machine, means operating automatically to deliver food, means operating automatically to measure a portion of condiment, means operating automatically to measure a portion of another condiment, a common controlling device for causing all of said means to operate, and means whereby the condiments may be delivered separately.

14. In a dispensing machine, means operating automatically to deliver food, means operating automatically to measure a portion of condiment, means operating automatically to measure another portion of condiment, and means for delivering said condiments.

15. In a dispensing machine, means operating automatically to pop and deliver the popped corn, said means including a rotatable member and a heating means, means operating automatically to measure a portion of condiment, a common controlling device for causing operation of the popping and delivering means and condiment measuring means, and manually controlled means for delivering the condiment.

In witness whereof I affix my signature in the presence of two witnesses.

FREDERICK O. BULLIS.

Witnesses:
GEO. C. SHOEMAKER,
CHAS. C. RICHARDSON.